May 26, 1925.

M. D. MURRAY 1,539,761

AUTOMOBILE PARKING GARAGE

Filed Sept. 7, 1923

Inventor
M. D. Murray

Inventor
M. D. Murray

May 26, 1925.

M. D. MURRAY 1,539,761

AUTOMOBILE PARKING GARAGE

Filed Sept. 7, 1923    5 Sheets-Sheet 3

Inventor
M. D. Murray

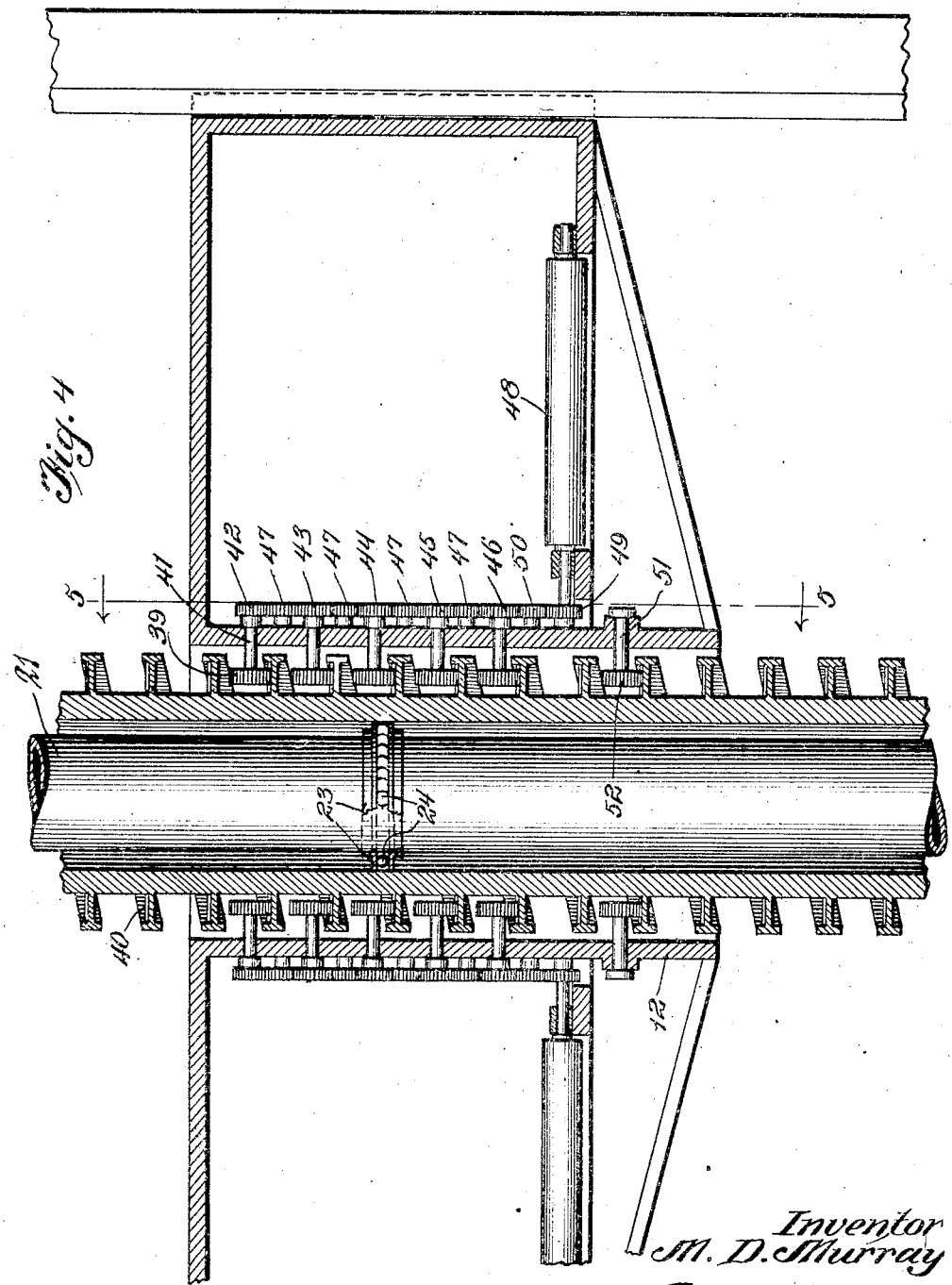

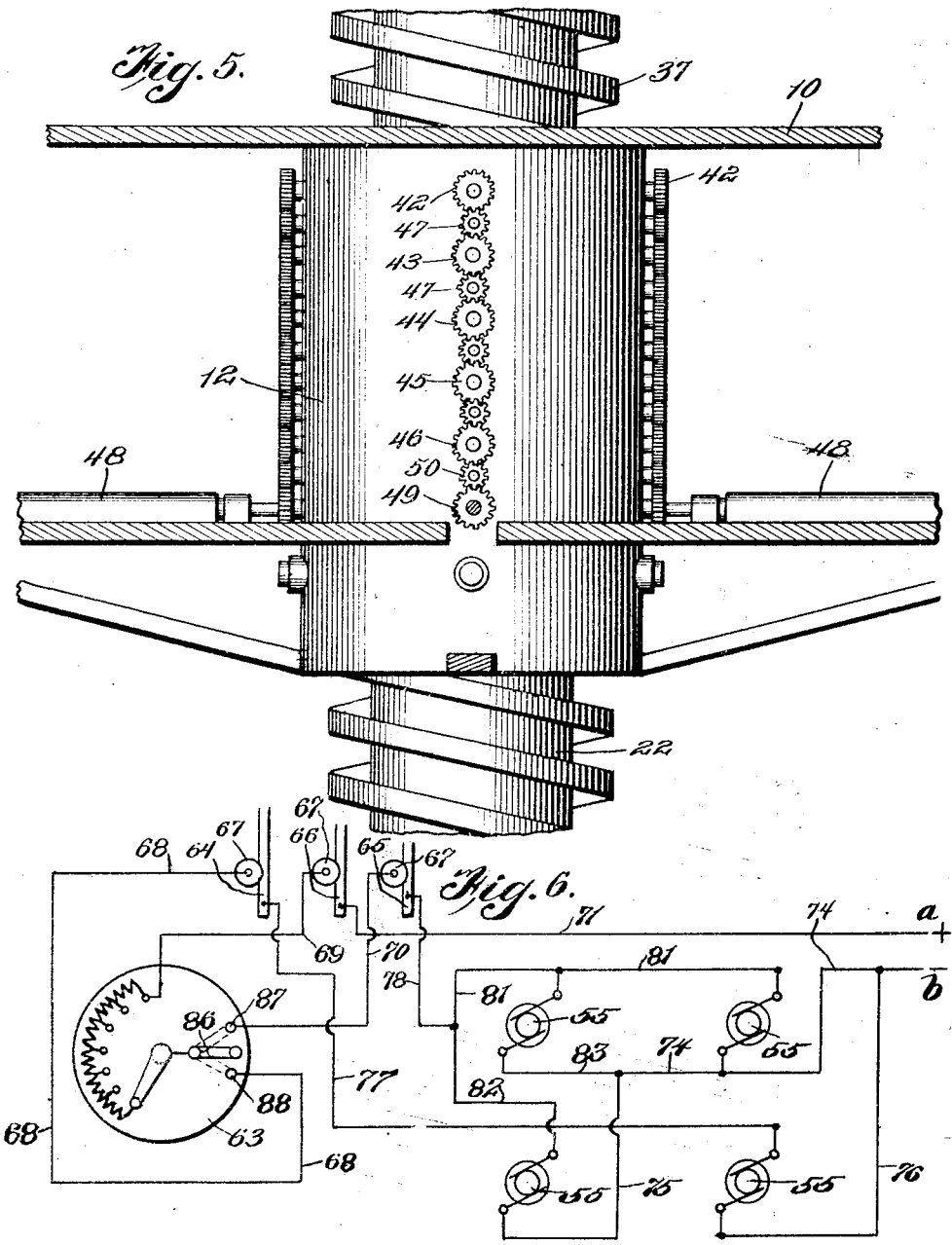

Patented May 26, 1925.

1,539,761

UNITED STATES PATENT OFFICE.

MICHAEL D. MURRAY, OF AMBRIDGE, PENNSYLVANIA.

AUTOMOBILE PARKING GARAGE.

Application filed September 7, 1923. Serial No. 661,467.

*To all whom it may concern:*

Be it known that MICHAEL D. MURRAY, a citizen of the United States, residing at Ambridge, in the county of Beaver and State of Pennsylvania, has invented new and useful Improvements in Automobile Parking Garages, of which the following is a specification.

In the business sections of large cities, considerable parking space is necessary to take care of automobiles which are, as a rule, driven down by business men in the morning and allowed to remain all day on the street, unless the large office buildings and business houses have some facilities to take care of the automobiles.

It is the purpose of the present invention to relieve this difficulty by providing parking garages, each taking care of at least five hundred and twenty-eight automobiles, thereby greatly reducing the necessary area. The capacity of the garages depends entirely upon the requirements. In the business section of a large city, there may be more than one garage, each making provision for a considerable number of automobiles. Each garage may provide for an overflow to insure taking care of the automobiles to be parked during the day.

A further purpose is to provide parking facilities for an indefinite period in the commercial center of a large city at a moderate cost, it being the aim to construct the garages closely in the neighborhood of the business section where the automobiles are within easy reach of the owners. Parking facilities of this character will also serve to relieve the possibility of fines levied upon the owners of automobiles for parking too long in certain places or for parking in forbidden places.

Still another purpose is the provision of parking facilities consisting of a housing under which a great number of automobiles may be protected under the one roof, thereby relieving the possibility of the loss of the automobile by theft as well as preventing damage to the automobile by the weather.

A further purpose is the provision of parking facilities consisting of a housing constructed at a considerable depth below and above the surface of the ground, including a number of floors, with improved means for transporting automobiles to any one of the floors.

A still further purpose is the provision of parking facilities wherein a housing is included with a number of superimposed floors with carriers operable upon a spiral column for transporting automobiles above and below the surface of the ground.

Furthermore, the invention has for its purpose controlling means on each carrier for operatively controlling electrical means remote from the carrier to insure ascending and descending of the carrier.

The invention also aims to provide means operated by the rear wheels of the automobiles when upon the carriers for assisting in raising and lowering the carriers upon the spiral gear on the column.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 4 is an enlarged sectional view through one of the carriers and the column, showing its operative connections therewith.

Figure 5 is an enlarged sectional view on line 5—5 of Figure 4, showing more clearly the construction of the spiral and the gears which operatively connect therewith for causing the carrier to raise and lower.

Figure 6 is a diagrammatic view of the electrical wiring for causing either of the carriers to ascend or descend, showing the motors in diagram for transmitting power to the column and also illustrating in diagram the controller to be carried by the carriers for controlling the motors.

Figure 1:
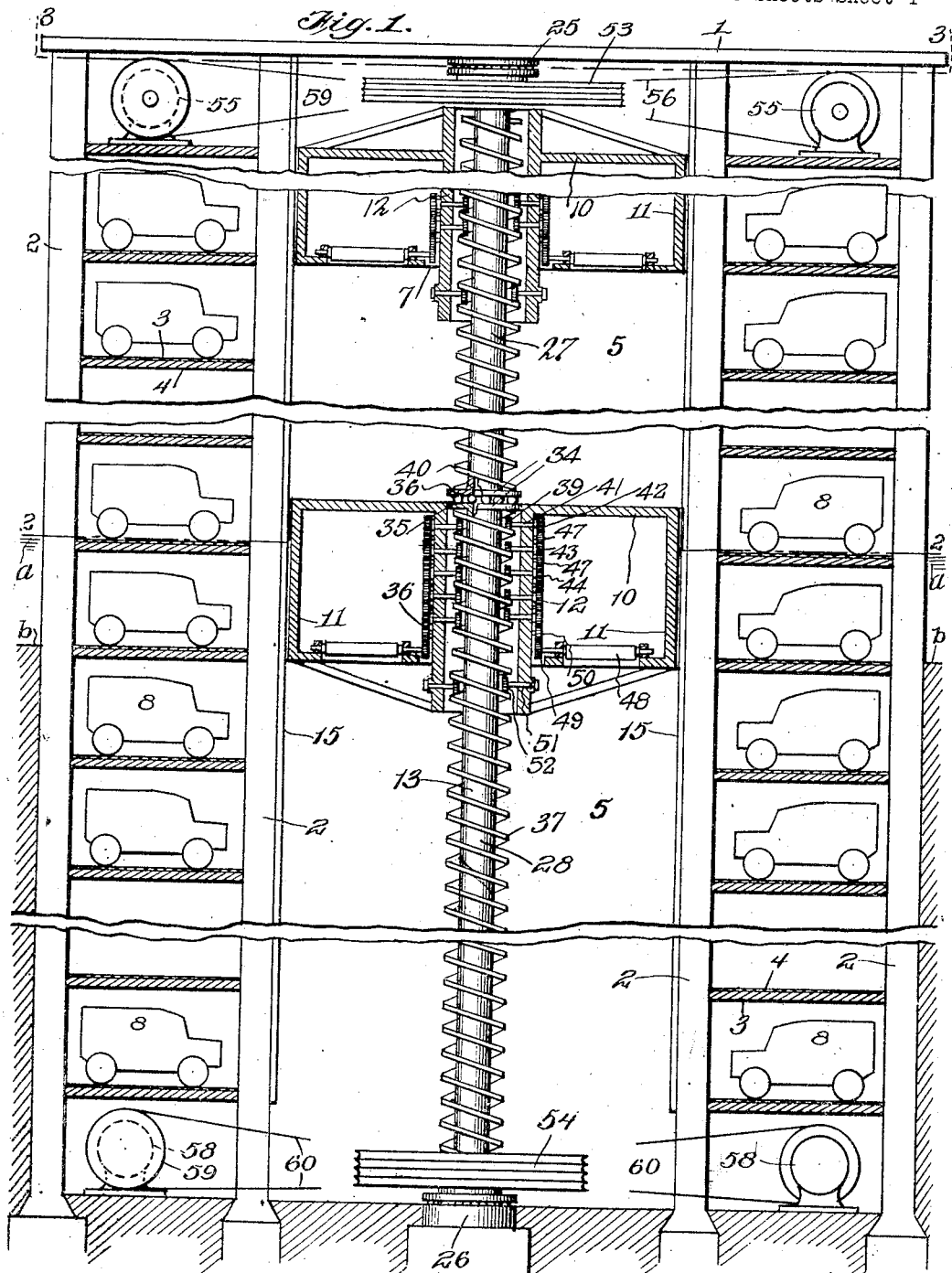
Figure 1 is a vertical sectional view through the improved parking garage constructed in accordance with the invention.
Figure 2:
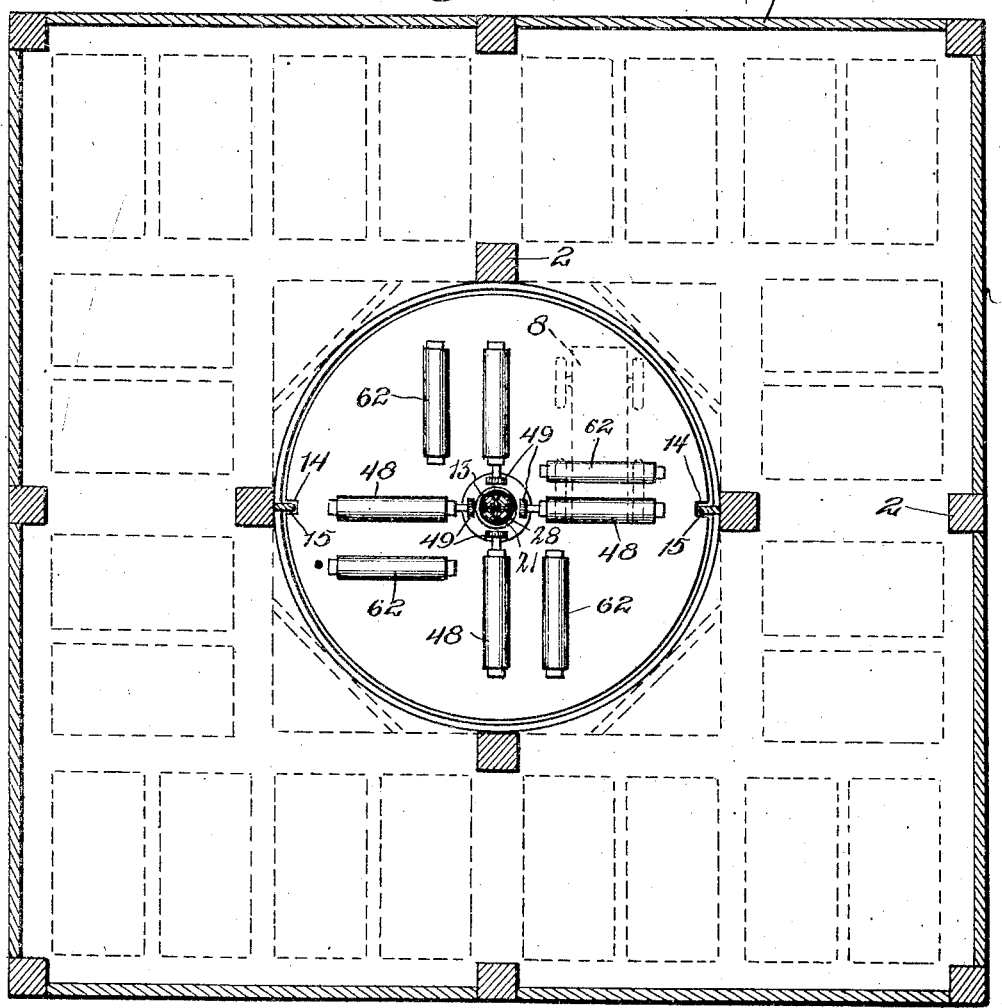
Figure 2 is a horizontal sectional view on line 2—2 of Figure 1, showing the operative connections between one of the carriers and the column.
Figure 8:
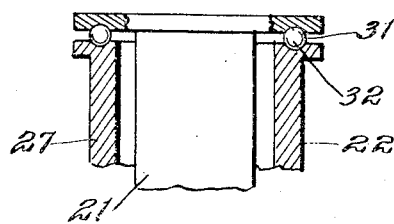
Figure 8 is a detail sectional view of the second tube 22 showing the ball bearings 31 at the top.
Figure 9:
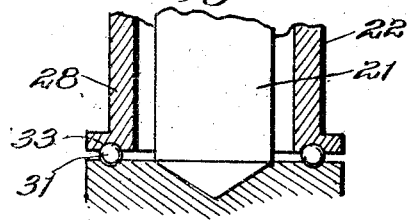
Figure 9 is a detail sectional view of the tube 22 showing the ball bearings 31 at the bottom.
Figure 3:
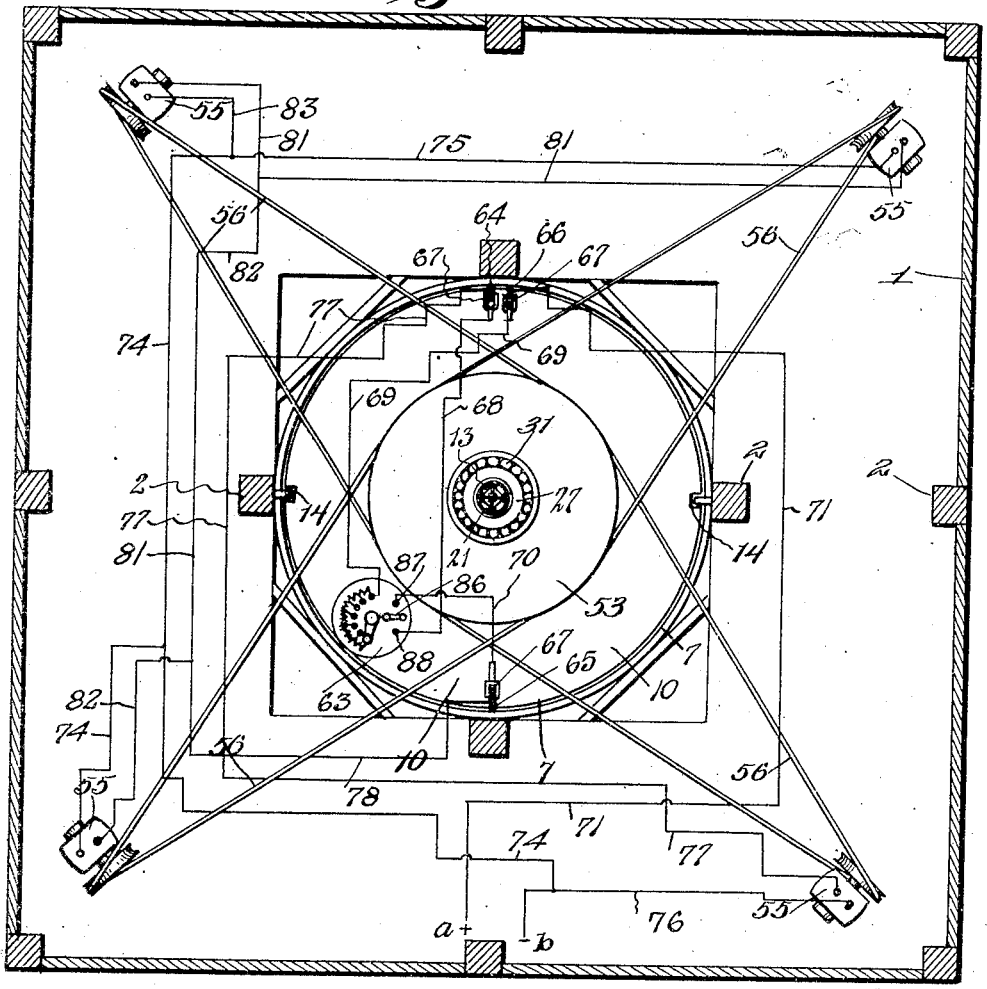
Figure 3 is a transverse sectional view on line 3—3 of Figure 1, showing the motors for driving the column, whereby the carriers may ascend or descend.
Figure 7:
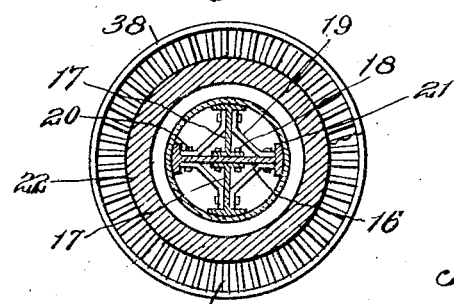
Figure 7 is a detail cross sectional view showing the spiral rack and the cylindrical tube 21 with its interior angle iron construction.

Referring to the drawings, 1 designates a building constituting a garage for the parking of a number of automobiles. To construct the building and to provide for stories or floors above and below the surface of the street or ground, it is the aim to excavate deep enough to provide at least eight or ten floors below the surface or level of the street and then construct the building to project above the surface or level of the street at least eight or ten stories.

The building comprises columns or beams of angular formation in cross section designated by the numeral 2 including angular floor beams or girders 3 for the support of concrete flooring 4. The present drawings are merely illustrative of a suitable garage or building, therefore bracing girders, angle irons or beams are omitted. However, in actual practice, the building or garage may be suitably reinforced and in plan, as shown in the transverse sectional views, the building or garage may be angular in cross sectional area although it may be otherwise shaped.

Preferably, the building comprises a central space 5 for the passage of carriers or elevators 6 and 7 which ascend and descend for distances above and below the surface or level of the street. The various floor spaces for the parking of automobiles 8 open into the central space so that, when the carrier or elevator registers with a floor, the several automobiles or other vehicles on the carrier may easily traverse from the carrier or elevator onto the floor and be arranged in their proper positions while parked during the day.

Each carrier or elevator comprises a platform 9 and a top or cover 10 which are relatively reinforced by the uprights or standards 11. Each carrier or elevator also includes a central cylinder 12. The platform 9 and the cover 10 have guide notches or recesses 14 which engage with the guide rails 15 which are secured in any suitable manner to certain of the vertical standards or beams 2 of the building or garage.

The carrier or elevator 6 operates downwardly from the street level or surface $b$ for a distance at least eight or ten floors, it depending entirely upon the size of the building or garage, while the carrier or elevator 7 is adapted to move from the street level $a$ to a height at least eight or ten floors above. However, each carrier or elevator is designed to register with a street level for the purpose of taking on automobiles or delivering them on the street.

A central vertical column 13 is provided and it comprises the main I-beam 16 and the additional I-beams 17 which are bolted or otherwise secured at 18 to the main I-beam. These beams are reinforced by angular plates 19 which are secured at 20 to the I-beams 16 and 17. This structure of I-beams, together with the reinforcing plates, is mounted within a cylindrical tube 21 and in surrounding spaced relation thereto are revoluble tubular sections 27 and 28.

The inner tube 21 at certain locations has annular shoulders 23 for the support of ball bearings or other antifriction devices 24 to permit the revoluble tubular sections 27 and 28 to freely revolve. The inner cylindrical tube 21 extends from the foundation of that portion of the building below the level of the street to the roof of the garage or building, while the remote ends of the upper and lower sections 27 and 28 are mounted in bearings 25 and 26 which are in the form of circular plates provided with raceways 29 and 30 for the reception of the ball bearings 31.

The remote ends of the sections 27 and 28 have flanges, the remote faces of which have raceways 32 and 33 which cooperate with the ball bearings 31 to insure free revoluble movement of the cylindrical tubular sections 27 and 28. The adjacent ends of the sections 27 and 28 have flanges 34, the adjacent faces of which are provided with raceways 35 which receive ball bearings 36 to further insure free revoluble movement of the sections 27 and 28. Carried by and mounted upon the outer periphery of the tubular sections 27 and 28 are spiral or helix tracks 37. These tracks are flanged, as at 38, to retain cog wheels 39 in engagement with the track. In fact, the spiral or helix track has rack teeth 40 with which the teeth of the cogs 39 mesh to insure travel on the track.

The cogs 39 are carried by shafts 41 which are mounted in bearings of and extend radially with relation to the cylinder 12. The outer ends of the shafts 41 are provided with gears 42, 43, 44, 45 and 46 between which idler gears 47 mesh. The idler gears 47 are carried by stub shafts which project from the outer surface of the cylinder 12. The idler gears 47 are provided for the purpose of causing the gears 42 to 46 to operate in uniform directions so as to cause the cogs 39 to mesh with the rack teeth on the track.

The platform is provided with radially disposed rollers 48, the pintles of which are mounted in bearings and the pintles at their inner ends have gears 49 which mesh with idlers 50 which, in turn, mesh with the gears 46. In this manner, motion is transmitted from the gears 49 to the train of gears above and, since these gears are carried by the shafts 41, the cogs 39 mesh with the teeth of the track. In order to additionally support the central cylinders 12 and carriers on the tracks of the sections 27 and 28, additional shafts 51 with cogs 52 are carried by the remote ends of the cylinders 12 so that the cogs 52 may mesh with the racks of the track. The shafts 51 extend inwardly and radially.

Carried by the upper end of the tubular section 27 is a plurality of pulleys 53 while the lower end of the section 28 is provided with a plurality of pulleys 54 similar to the pulleys 53. Mounted in the four corners of the top floor of the building or garage are motors 55 which are operatively connected with the four pulleys 53 by means of the belt cables 56. The shafts of the motors carry pulleys 57 which are engaged by the belt cables. The lowermost floor of the building or garage has a plurality of motors 58 in the four corners thereof provided with pulleys 59 operatively connected by cable belts 60 with the four pulleys 54 at the lower end of the section 28.

The motors are designed primarily for raising and lowering the carriers or elevators. Three of the motors of the extreme lower floor are employed for causing the carrier or elevator 6 to ascend while the other motor is used for causing the carrier or elevator 6 to descend. The same thing is true with regard to the motors in the uppermost floor of the garage or building, namely, three of them are used to cause the elevator or carrier 7 to ascend and one to cause it to descend.

However, the elevators or carriers are assisted in their ascension and descension due to the tread rollers 48 with which the rear drive wheels of four automobiles which may be contained on each carrier engage. The drive wheels of the automobiles are retained in engagement with the tread rollers 48 by means of additional rollers 62.

In order to control the motors when the carrier is ascending and descending, a suitable controller 63 is mounted upon the carrier, there being trolley rods 64, 65 and 66, with which the trolley wheels 67 engage. These trolley wheels are connected by the leads or wires 68, 69 and 70 with the controller. The motors receive current from any suitable source, for instance, from a dynamo, service line, or as indicated at $a$ and $b$. In fact, the trolley rod 66 connects with the source of supply by means of a wire 71 while certain of the motors are connected by a wire or lead 74 with the other side of the supply. Certain other of the motors are connected by the wires or leads 75 and 76 with the wire or lead 74. A wire or lead 77 connects with the trolley rod 64 and, in turn, to one of the motors 55. A wire or lead 78 is connected to the trolley rod 65 and, in turn, is in circuit with three of the motors by means of the leads 81, 82 and 83. This wiring is used in duplicate. For instance, the carrier or elevator 6 is wired with the motors at the bottom of the building while the carrier or elevator 7 is wired with the motors at the top of the building. In fact, the circuits are independent and when the carrier or elevator 7 is lowered to the street level, the carrier 6 must be below the street level and when the carrier or elevator 6 is in register with the street level, the carrier or elevator 7 may be in register with one of the floors above.

The controller on the carrier or elevator is of a conventional construction and includes a switch 86 for reversing the current for ascending or descending the carrier or elevator. When moving the switch to engage with the contact 87, three of the motors at the top will be energized to cause the carrier or elevator to ascend. By reversing the position of the switch 86 to engage with the contact 88, a single motor is energized for causing the carrier or elevator to descend.

In the operation, the carrier is designed to be brought into register with the street level and a number of automobiles, say for instance four, are placed upon the carrier. If it is the carrier 6, the controller is operated to cause the carrier to descend, therefore the controller is operated to close the circuit which will cause the carrier to lower due to the fact that the cylindrical tubular section 28 revolves. The same thing is true with the carrier which operates from the street level $a$ to the top of the building or garage. The carrier 7 is designed to be lowered in register with the street level $b$ and, after being loaded, the controller may be operated to cause the carrier to ascend. Referring to Figure 1, it will be noted that the garage is constructed so that certain automobiles may pass out on one street level while certain other of the automobiles may pass out on other street levels. In fact, the levels on which the automobiles travel when passing out of the garage are at right angles, so that the automobiles that are conveyed from the upper floors of the garage may pass out on the street level $a$ while the automobiles from the lower floors, that is, below the street level, may be elevated and allowed to pass out upon the level $b$. To accomplish this, the carrier 7 may be lowered to a position indicated in dot and dash lines in Figure 1 while the carrier 6 may be elevated to a position indicated in full lines in Figure 1. The floors of these carriers in this way will assume positions flush with the levels $a$ and $b$.

The invention having been set forth, what is claimed is:

1. In a parking garage, a housing including a plurality of floors above and below a general street surface and provided with a central passage opening into the several floors, independently operable tubular sections axially mounted in said central passage and having spiral tracks, and carriers movable upon the said sections and having operative connections with the tracks, whereby the tracks may ascend and descend and adapted to register with any one of the floors.

2. A parking garage including a plurality of floors above and below a general street surface and provided with a central guide space, carriers operatively mounted and guided in said space, means for operating the carriers, whereby they may ascend and descend to register, one with the floors above the general street surface, the other with the floors below the street surface.

3. A parking garage including a plurality of floor spaces above and below a general street surface for parking of automobiles and provided with a central guide space opening into the several floor spaces, a pair of axially aligned tubular sections operatively mounted in said guide space, carriers operatively mounted in the guide space, and means on the carriers operated by motor driven vehicles supported upon the carriers and with operative connections with said sections to ascend and descend the carriers.

4. A parking garage including a plurality of floor spaces above and below a general street surface for parking of motor driven vehicles and provided with a central guide space, a pair of tubular sections vertically axially aligned mounted in said guide space, carriers operative in the guide space and having means operatively connecting with the tubular sections for ascending and descending the carriers, and means operated by the motor driven vehicles to be supported upon the carriers for driving said first means.

5. A parking garage including a plurality of floor spaces above and below a general street surface for the parking of motor driven vehicles and provided with a central guide space, a pair of tubular sections vertically axially aligned in said space, carriers operable in the guide space and provided with operative connections with said sections for ascending and descending the carriers, and electrical means operatively connected with the sections to rotate the same to operate the carriers.

6. A parking garage including a plurality of floor spaces above and below a general street surface for the parking of motor driven vehicles and provided with a central guide space, a pair of tubular sections vertically axially aligned in said space, carriers operative in said space and having means operatively connected with the sections for ascending and descending the carriers, means operated by the motor driven vehicles to be supported on the carriers for driving the first means, and electrical means operatively connecting with the sections for rotating the same to raise and lower the carriers.

7. A parking garage including a plurality of floor spaces above and below a general street surface for the parking of motor driven vehicles and provided with a central guide space opening into the several floor spaces, a pair of tubular sections vertically axially aligned and mounted in said space and provided with spiral tracks, carriers operable in the guide space and having operative gear connections respectively with the spiral tracks, and electrical means operatively connecting with the tubular sections for rotating the same for ascending and descending the carriers, whereby they may register, one with any floor above the general surface, the other with any floor below the general surface.

8. A parking garage including a plurality of floor spaces above and below a general street surface for parking of motor driven vehicles and provided with a central guide space opening into the several floor spaces, a pair of tubular sections vertically axially aligned and operatively mounted in the central guide space and provided with spiral tracks, carriers operable in said space, means on the carriers including trains of gears operatively connecting with the spiral tracks, and mechanisms on said carriers and operatively connected with the trains of gears and adapted to be actuated by the drive wheels of the motor driven vehicles for ascending and descending the carriers.

9. A parking garage including a plurality of floor spaces above and below a general street surface for parking of motor driven vehicles and provided with a central guide space opening into the several floor spaces, a pair of tubular sections vertically axially aligned and operatively mounted in the central guide space and provided with spiral tracks, carriers operable in said space, means on the carriers including trains of gears operatively connecting with the spiral tracks, mechanisms on said carriers and operatively connected with the trains of gears and adapted to be actuated by the drive wheels of the motor driven vehicles for ascending and descending the carriers, and electrical means operatively connecting with the tubular sections for rotating them to insure raising and lowering the carriers.

10. A parking garage including a plurality of floor spaces above and below a general street surface and provided with a central guide space opening into the several floor spaces, carriers guided in said space, a pair of axially aligned tubular sections in said space and provided with spiral tracks operatively connecting with the carriers for ascending and descending the same, and means for imparting revoluble movement to said sections.

In testimony whereof he affixes his signature.

MICHAEL D. MURRAY.